(12) United States Patent
Zebuhr

(10) Patent No.: US 6,423,187 B1
(45) Date of Patent: *Jul. 23, 2002

(54) HEAT EXCHANGER MECHANISM USING CAPILLARY WIPERS FOR A THIN FILM DISTILLER

(75) Inventor: William H. Zebuhr, Nashua, NH (US)

(73) Assignee: Ovation Products Corporation, Nashua, NH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/209,948

(22) Filed: Dec. 11, 1998

(51) Int. Cl.⁷ .................................................. B01D 1/22
(52) U.S. Cl. ........................ 202/236; 202/174; 202/175; 202/265; 202/267.2; 203/25; 203/72; 203/89; 159/6.2; 159/13.1; 159/21; 159/22; 159/25.1
(58) Field of Search ................... 159/6.2, 13.1, 159/21, 22, 25.1; 202/174, 175, 205, 236, 265, 267.2, 270; 203/25, 72, 89

(56) References Cited

U.S. PATENT DOCUMENTS

| | | |
|---|---|---|
| 2,703,310 A | 3/1955 | Kretchmar |
| 2,894,879 A | 7/1959 | Hickman |
| 3,136,707 A | 6/1964 | Hickman ..................... 202/236 |
| 3,764,483 A | 10/1973 | Tleimat |
| 3,890,205 A | 6/1975 | Schnitzer |
| 4,329,204 A | 5/1982 | Petrek et al. |
| 4,329,205 A * | 5/1982 | Tsumura et al. ............ 202/174 |
| 4,402,793 A * | 9/1983 | Petrek et al. ................ 202/174 |
| 4,504,361 A | 3/1985 | Tkac et al. |
| 4,585,523 A | 4/1986 | Giddings |
| 4,586,985 A | 5/1986 | Ciocca et al. |
| 4,707,220 A | 11/1987 | Feres |
| 4,731,159 A | 3/1988 | Porter et al. |
| 5,045,155 A | 9/1991 | Ramsland |
| 5,409,576 A * | 4/1995 | Tleimat ....................... 202/174 |
| 5,411,640 A | 5/1995 | Ramsland |

FOREIGN PATENT DOCUMENTS

DE 16134 5/1881

* cited by examiner

Primary Examiner—Jerry D. Johnson
Assistant Examiner—Frederick Varcoe
(74) Attorney, Agent, or Firm—Cesari and McKenna, LLP

(57) ABSTRACT

A thin film distiller is provided which applies distilland to an evaporative side by the use of wicks which work by capillary action. The evaporated vapor is transferred to the condensate side after being compressed to a higher pressure where it is condensed and removed by similar wicks. The condensing and evaporating surfaces are formed on opposing sides of a bellows-like sheet of heat conducting material. The sheet would preferably be formed into a cylindrical shape with the evaporative stage on the outside and the condensing stage on the inside of the cylinder. Either the wicks or the heat conducting material are moved with respect to the other such that the wicks place a thin film of distilland on the evaporative surface. Removal of condensate is performed in a similar manner by the wicks in the condensate stage.

14 Claims, 8 Drawing Sheets

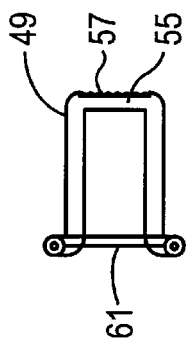
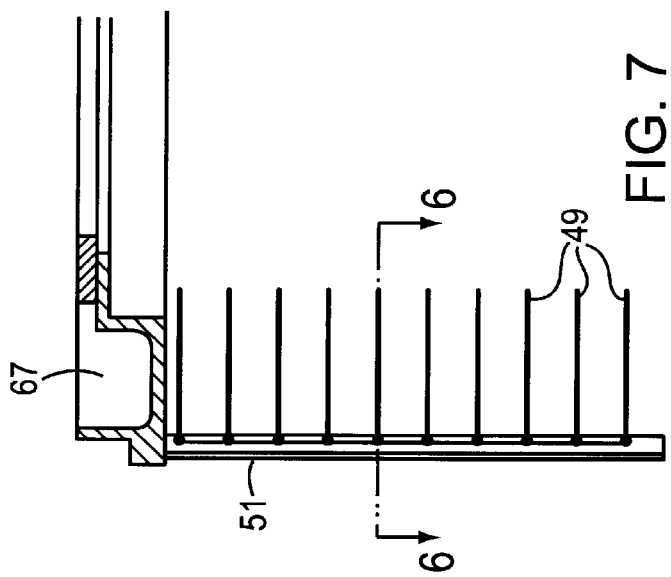
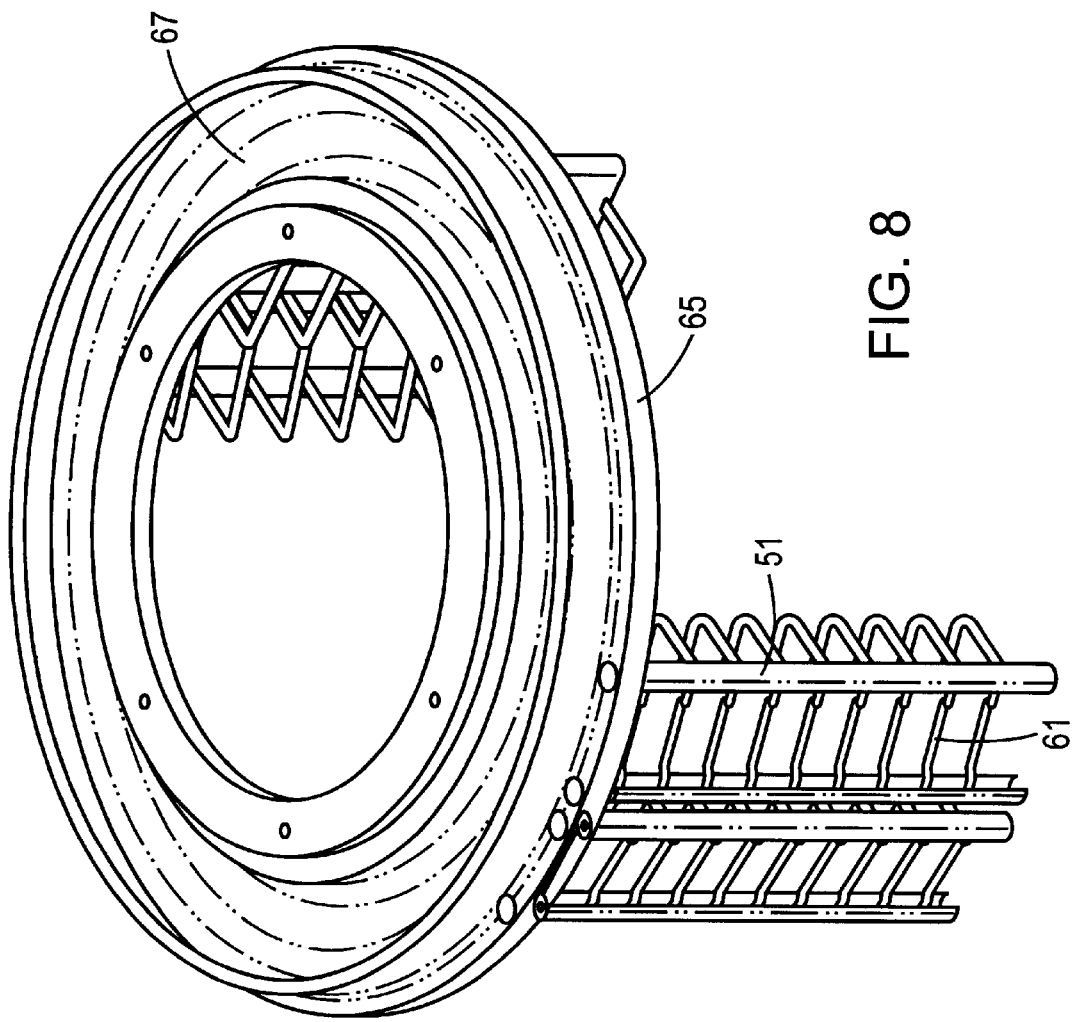

HEAT EXCHANGER MECHANISM USING CAPILLARY WIPERS FOR A THIN FILM DISTILLER

BACKGROUND OF THE INVENTION

The present invention relates to an improvement in heat exchanger design, more particularly to thin film distillation systems.

It is well known in the art to provide a distiller which utilizes the condensation of vapor on one side of a heat conductive plate to provide the heat for evaporation of a liquid on the opposite surface of the plate. In some systems it can often be important to minimize the overall temperature difference through which the process occurs. One method which allows the process to occur without requiring a high temperature differential is to maintain a thin film of liquid on the evaporative side and a minimum film of condensate on the condensing side. This enables the thermal resistance of the films to be minimized.

Currently used methods include application of liquid with a squeegee such as in U.S. Pat. No. 5,409,576 to Tleimat or liquid application by spraying the film on a rotating disc and allowing condensate removal by centrifugal acceleration such as in U.S. Pat. No. 4,731,159 to Porter et al. Others use gravity as in U.S. Pat. Nos. 4,329,204 and 4,402,793 both to Petrek et al. Though each apparatus has its advantages, each require extensive hardware and fairly large spacing between plates. What is needed is a system which allows the use of compact simple hardware particularly suited to smaller systems.

SUMMARY OF THE INVENTION

Until the present invention, compact low energy requirement evaporative systems were not practical and thus have not been commercialized. The purpose of this invention is to enable the efficient application of a thin film of liquid to closely spaced heat exchanger surfaces without having to resort to expensive and precise mechanisms. Additionally, an apparatus meeting these requirements should also enable the removal of condensate from closely spaced surfaces without the need to rely upon rotation of the heat exchanger or to require specific orientation of the surface to enable removal of the condensate by gravity.

A new and non-obvious distillation system which accomplishes these requirements is introduced herein. In its most simplistic form, the invention comprises a pad of resilient material which can hold and move a distilland liquid to be applied by capillary action, and a means to move the pad repeatedly across an evaporator heat transfer surface to apply and renew a thin film of liquid on the surface. The pad is connected to a supply of the liquid, which is continually fed to the surface as it evaporates. In practice the pad is sized to move easily in the gap between two closely spaced corrugations of a surface thus applying liquid to each side of the gap.

In a preferred embodiment the heat transfer surface is a corrugated cylinder or bellows comprising a thin heat conductive material. A set of pads is aligned to rotate about the axis of the heat exchanger within the outer corrugations forming the heat transfer surface. These pads apply a liquid to be evaporated. Another set of pads, aligned to rotate about the center of the heat exchanger within the inner corrugation serve to remove condensate. This embodiment could be utilized as the heat transfer system of a vapor compression distiller where vapor leaving the outer surface is compressed and introduced to the inside surface which is otherwise sealed from the outside in order to maintain the required pressure differential.

As such it is an object of the present invention to provide a thin film heat exchanger system which places a thin film of liquid for evaporation on a surface by use of a capillary applicator.

Another object of the present invention is to provide a heat exchanger utilizing a capillary applicator capable of applying a thin film of liquid between two closely spaced surfaces.

Still a further object of the present invention is to provide a liquid distiller which operates efficiently and requires minimum energy input into the system to perform.

BRIEF DESCRIPTION OF THE DRAWINGS

The novel features considered characteristic of the invention are set forth in the appended claims. The invention itself, however, both as to its construction and its method of operation, together with additional objects and advantages thereof, will best be understood from the following description of the specific embodiments when read and understood in connection with the accompanying drawings.

FIG. 6 is a top view of a wiper support for use in the FIG. 3 device;

FIG. 7 is a side view of the FIG. 6 wiper supports;

FIG. 8 is an isometric perspective view of an assembly of wiper supports;

DETAILED DESCRIPTION OF PREFERRED EMBODIMENTS

The preferred embodiments of this invention are mechanisms that allow movable contact between a capillary applicator and a heat exchanger surface with maximum effectiveness and minimum cost. A heat exchanger utilizing this invention can have plates that are more closely spaced than currently allowed with other heat exchangers. The separation between the plates is limited by two parameters. The first being the smallest dimension in which the liquid does not bridge the gap between the plates; and the second being the thickness of the applicator since it needs to accommodate liquid flow as well as physically fit between the plates.

Figure 1:
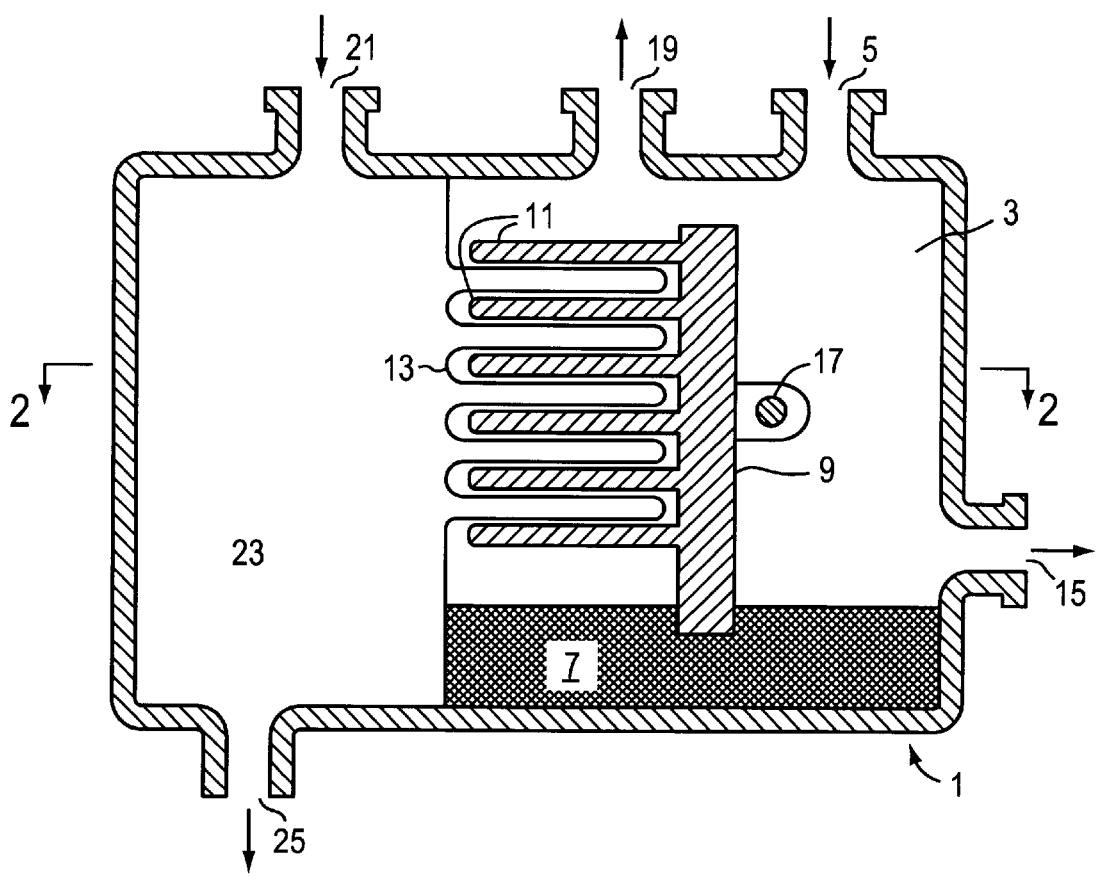
FIG. 1 is a side elevation sectional view of a simplified heat exchanger with a capillary applicator array in accordance with the present invention.
Figure 2:
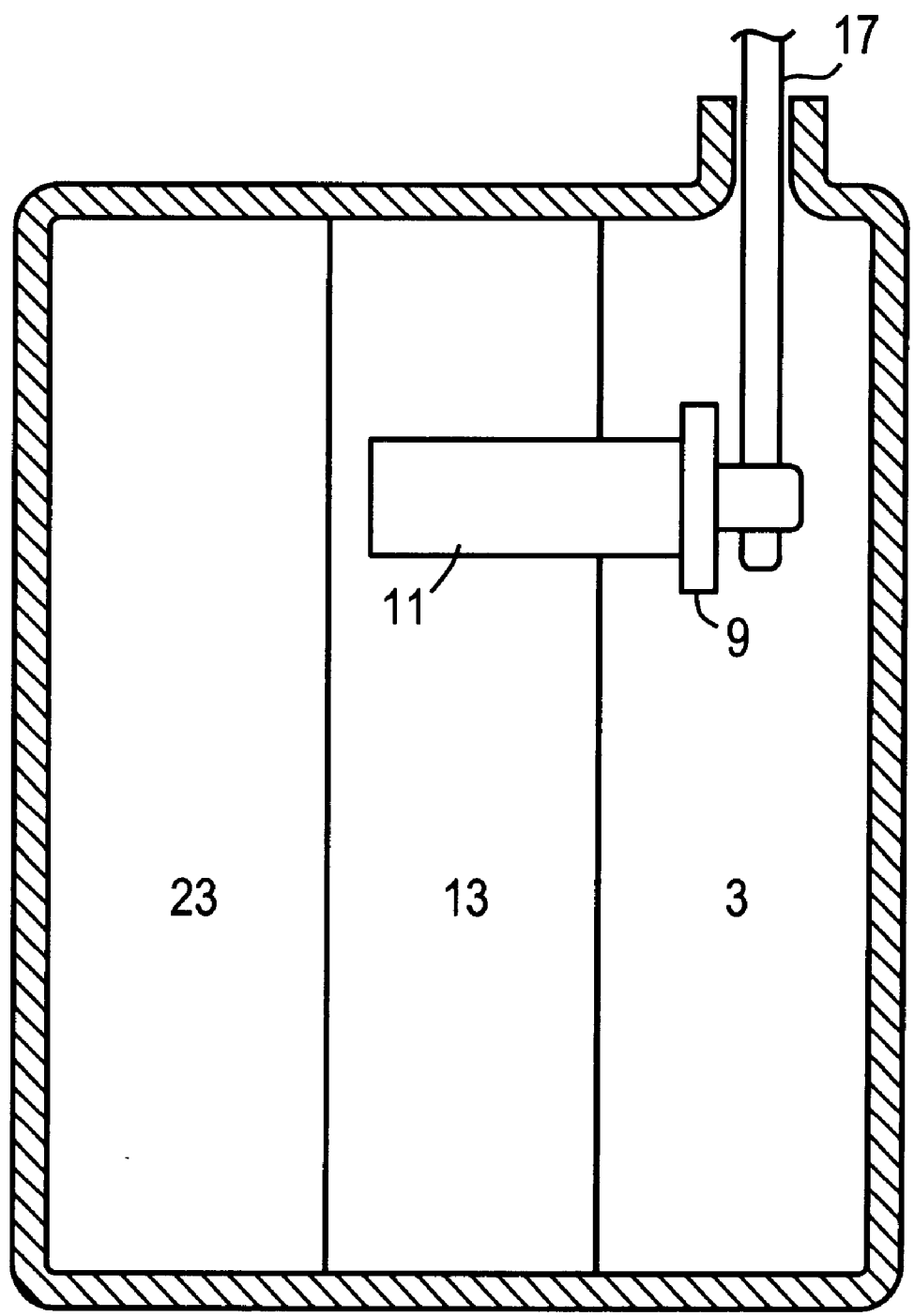
FIG. 2 is a top sectional view of the apparatus of FIG. 1 taken through 2—2.

Looking now more specifically at FIGS. 1 and 2, a simple heat exchanger system designated generally at 1 is depicted. Liquid to be evaporated enters a chamber 3 via an inlet port 5 and collects in a sump 7. The liquid is absorbed via capillary action by a central capillary 9 and distributed to any number of branch capillaries 11 where it is applied to a heat exchanger surface 13. Should the sump 7 have excess liquid, an overflow port 15 can be provided to drain said liquid. Although in each preferred embodiment of the invention the capillaries 9 and 11 are preferably wicks comprising woven or non-woven cloth or pads, for the purpose of the invention a capillary applicator could also be a brush, foam pad, a rigid yet porous material, a combination of these, or any other structure so long as the resulting structure can transport liquid by capillary attraction. As such, capillaries 9 and 11 form a capillary applicator array designed to remove liquid from the sump 7 and distribute it on the heat exchanger surface 13. To enable the applicator array to distribute the liquid, the heat exchanger surface 13 or the capillaries 11 must be moved one with respect to the other. To accommodate this requirement, a rod 17 mountably attached to the capillary applicator array 9 and driven by a driving means (not shown) is made to reciprocate causing the applicator array to move back and forth on the heat exchanger surface 13. As the liquid is evaporated, vapor can leave the evaporation chamber 3 via a vapor port 19. In a vapor compression distiller the exiting vapor would be compressed by a compressor (not shown) and then allowed to enter an inlet port 21 leading into a condensing chamber 23. The vapor entering the condensing chamber 23 now at a slightly higher pressure condenses upon the opposite face of the heat exchanger surface 13. Condensate leaves via drain port 25.

Though the above constitutes a simplified version of the present invention, a more complex version could provide a capillary array which is used in reverse to actually remove liquid from a surface. For instance, a second applicator array could be made to follow the first applicator array. The second array would be utilized to remove excess liquid film thickness after the first applicator array applied the liquid to the evaporative surface. Additionally, a capillary array could even be utilized on the condensate side of the system to remove condensate and allow it to collect in the bottom of chamber 23. It is of course desirable to utilize the capillary applicator in conjunction with treated surfaces. For instance, it is well known in the art to treat the evaporator side of heat exchanger surface 13 to make it more wettable and to treat the condensation side of heat exchanger surface 13 to reduce wettability resulting in the creation of droplets that cover less surface area and are easier to remove. Though this is a common practice it is a desirable addition from the standpoint that it would increase the efficiency of the system.

Figure 3:
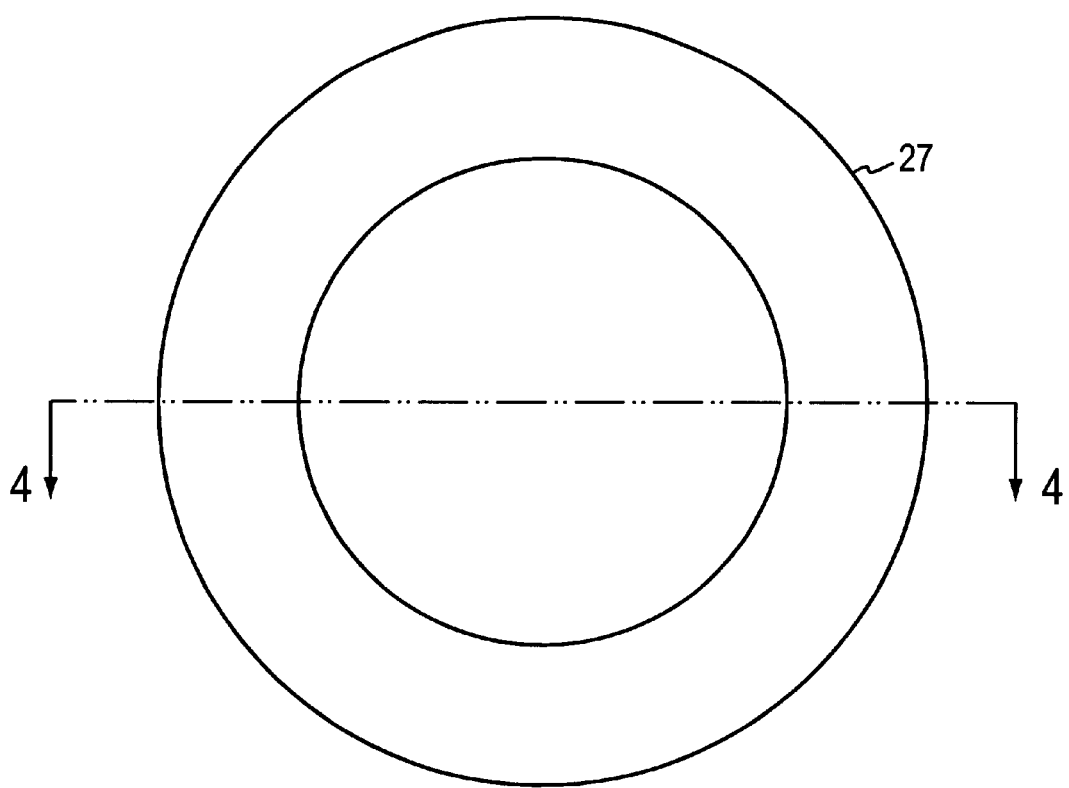
FIG. 3 is a top view of a preferred heat exchanger.
Figure 4:
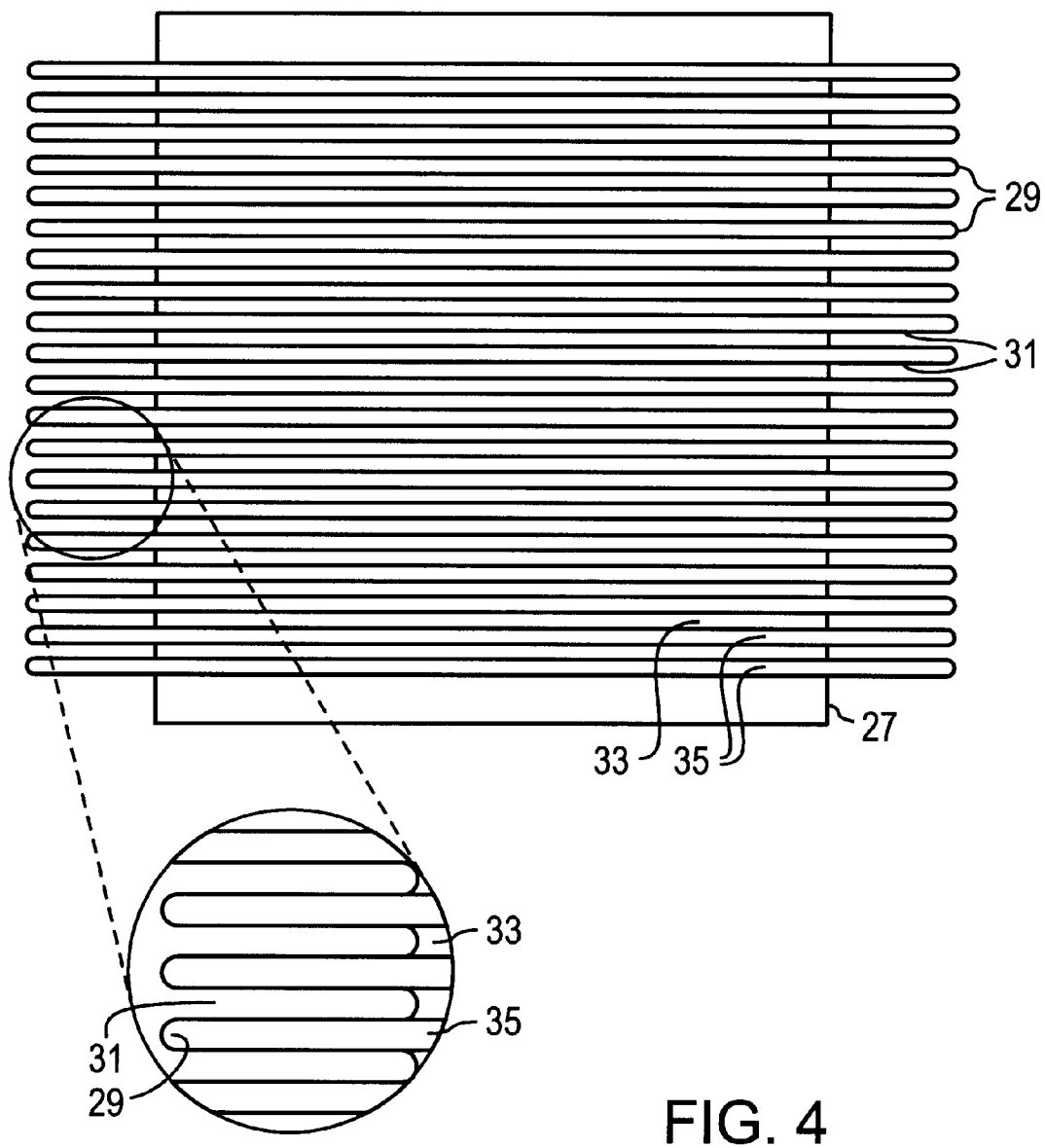
FIG. 4 is a side elevation of the FIG. 3 heat exchanger.

Another preferable embodiment of the present invention is depicted in FIGS. 3 and 4. These FIGS. show a preferred embodiment of a heat exchanger design 27 that is in the form of a bellow shaped cylinder or corrugated tube with outer convolution 29 and corresponding channels 31 forming the evaporator surface and inner convolutions 33 with corresponding inner channels 35 forming the condenser surface.

Figure 5:
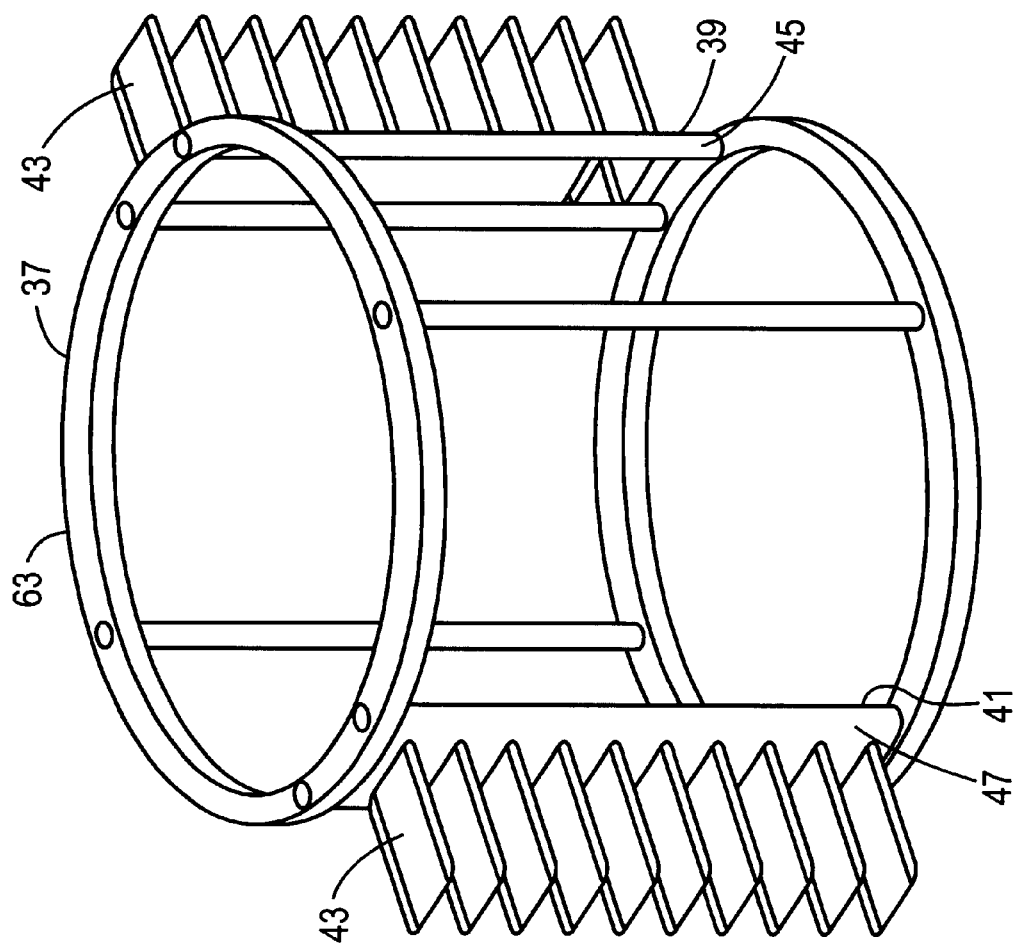
FIG. 5 is an isometric perspective view of a capillary applicator array used to remove condensate from the inside of the heat exchanger of FIG. 3.
Figure 9:
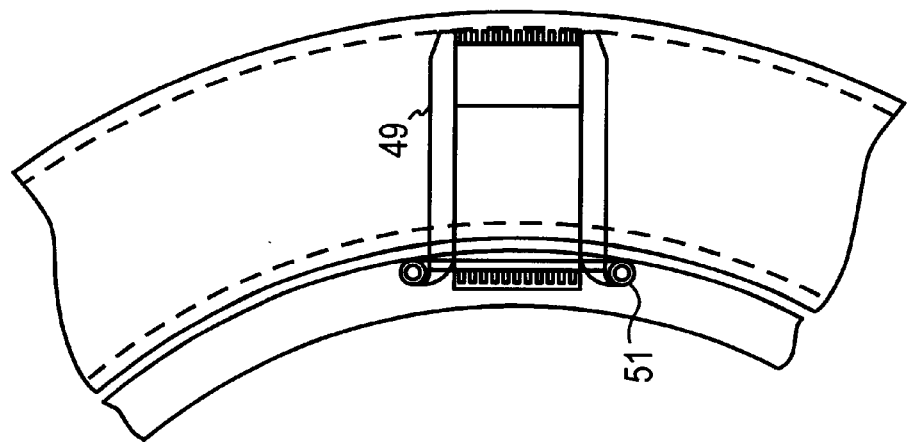
FIG. 9 is a top view of a wiper and wiper support in a preferred heat exchanger embodiment.
Figure 10:
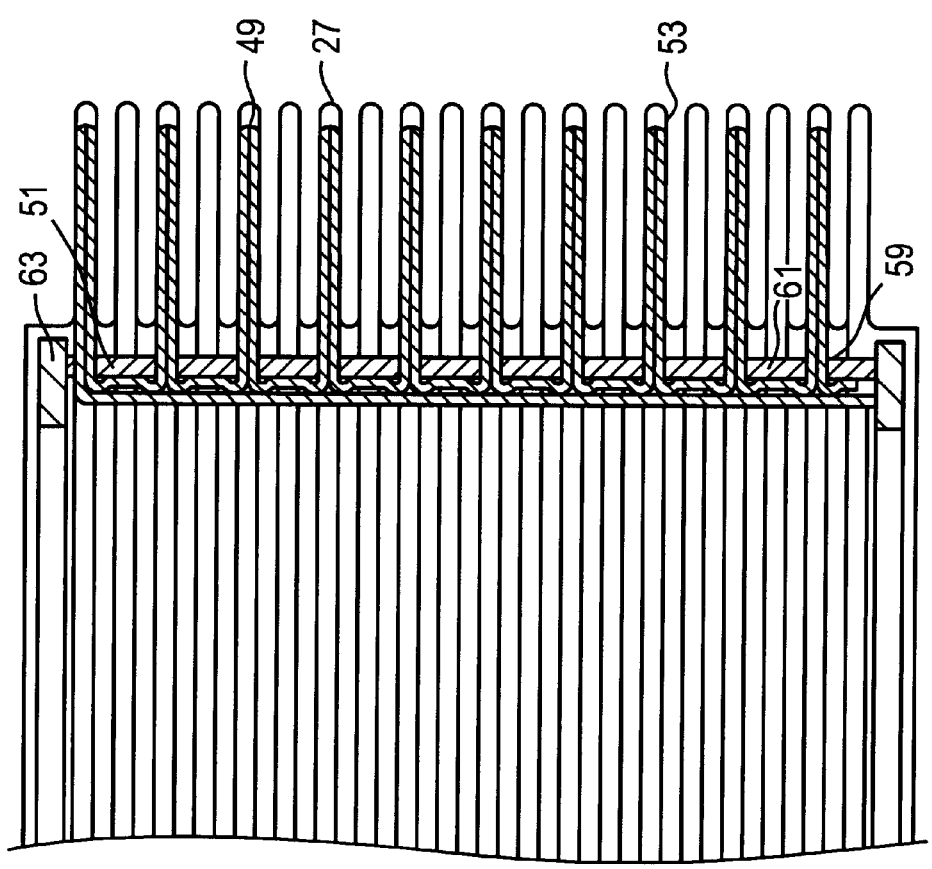
FIG. 10 is a side sectional view of an array of wipers and wire supports of FIG. 9.

FIG. 5 shows a rotatable assembly of capillary applicators 37 that can be assembled inside heat exchanger 27 to remove condensate. The assembly includes two vertical capillary applicator arrays 39 and 41 positioned diametrically opposite one another. Each array has a number of capillary applicators 43 spaced to fit in every other channel 35. The two vertical arrays are coordinated so that each channel 35 has a capillary applicator associated with it. In the embodiment depicted, applicator array 39 has an applicator 43 associated with every other channel 35. Whereas applicator array 41 has an applicator 43 associated with the remaining every other channel 35. It is intended that the entire assembly 37 can be rotated generally between 10 and 30 rpm inside heat exchanger 27. This would effectively remove condensation from the surfaces of channels 35. Each capillary applicator 43 is made to contact vertical holders 45 and 47 so that condensate can be drawn from the applicators 43 to the vertical holder. Each vertical holder contains an additional capillary element which removes condensate from capillary applicators 43 and transports the condensate to a designated region such as a sump. The vertical capillaries can be designated to take advantage of gravity to assist in removing condensate.

FIG. 6 shows a capillary applicator support 49, a series of these are needed to hold applicators 43. In a preferred embodiment, each support 49 is a thin metal or plastic clip approximately 0.005 to 0.020 inch thick that can be snapped into a holder 51. These holders 51 are best illustrated in FIGS. 7 through 10. Referring to these figures, the capillary material preferably comprises a fabric wick 53 that wraps around a bridge 55 of holder 51. The wick is held in place by small projections 57 and extend on each side of support 49 until passing through suitable slots 59 in the holder 51 and wraps around cross pieces 61 to pass through another slot and wrap around another support. The wick then is formed from a single piece of material for each subassembly of supports 49 and holder 51. The support 49 is assembled into holder 51 by sliding it through slots from the back-side, the side opposite the extended support.

In mass production a suitable length of wick material can be extended across the small projection 57 and bridge 55 of the supports, allocated to a holder, at intervals corresponding to the length of wick per support. Then the supports are brought together to a spacing corresponding to the slots in holder 51 as the wick becomes pleated and folds over the supports and the array of supports is pushed through the mounting slots from the back side of holder 51 and snapped into place. This forms an assembly shown in FIG. 9 that can be mounted to a rotatable frame 63 of FIGS. 5 and 10, or frame 65 of FIG. 8.

FIG. 8 shows double sets of wicks oppositely mounted to frame 65. When the assembly is rotated in the channels 31 of heat exchanger 27 there is a leading and following wick moving in each channel 27 This can result in a better liquid film on the surface of heat exchanger 27. The lead wick can remove residual concentrate from the surface while the following wick applies a new film. An alternative method is to have the leading wick apply excess liquid whereas the following wick removes the excess and spreads a suitably thin film.

Frame 65 contains a channel 67 that can pick up liquid from a stationary source and facilitate its distribution to the capillary arrays, for example, by means of small bleed ports or by having an end of the wick material submerged in the liquid in channel 67. In fact, it is desirable to position the channel 67 vertically higher than the wick 53 to better enable flow by utilizing gravity assist.

Figure 11:
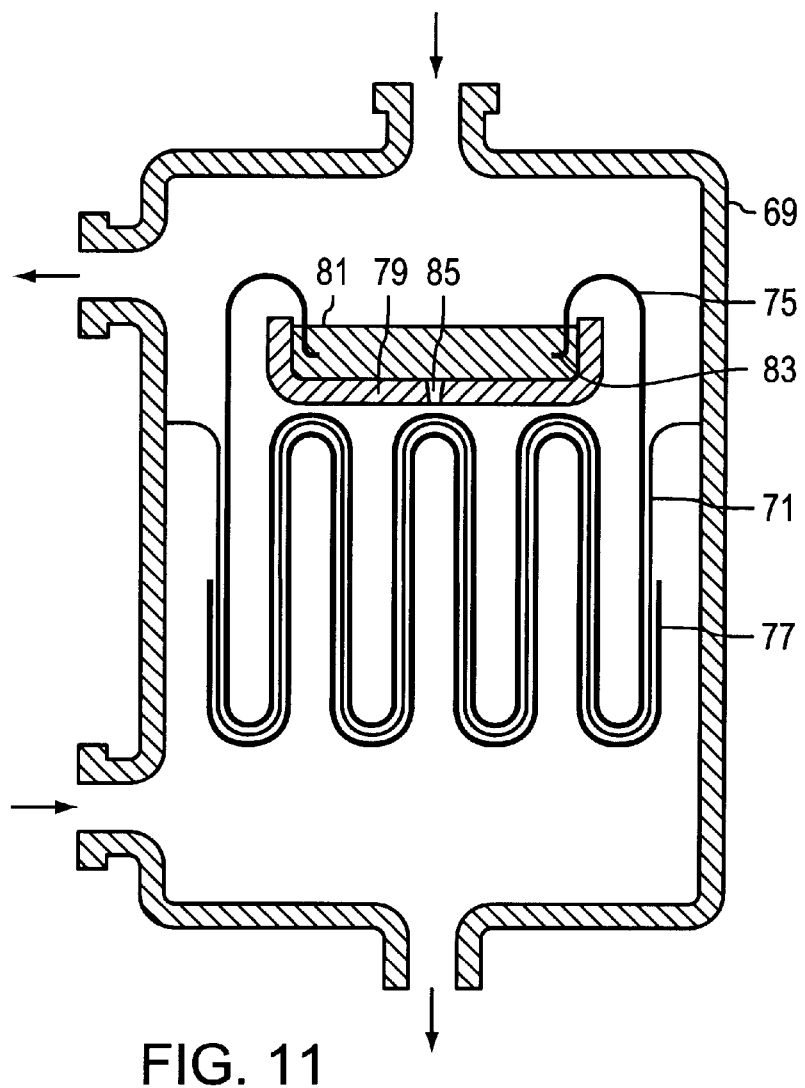
FIG. 11 is a side elevation sectional view of a representative heat exchanger showing an alternative plate orientation.
Figure 12:
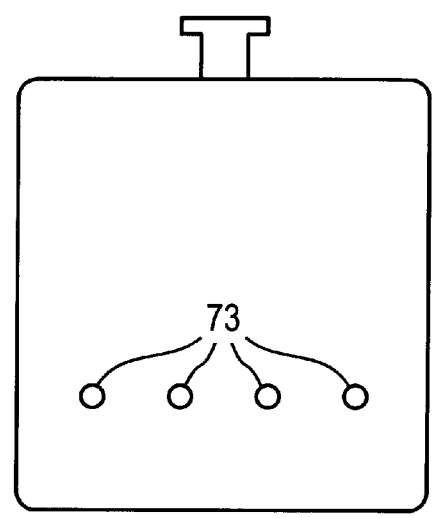
FIG. 12 is an end view of the housing of the heat exchanger of FIG. 11.

FIGS. 11 and 12 depict an alternative heat exchanger system 69 similar to FIGS. 1 and 2 but oriented so that the channel surfaces 71 are vertical. The disadvantage of this arrangement is its requirement to individually drain each channel via ports 73 so the channels do not become filled with liquid. The advantage is that gravity assists in the flow through the capillary applicators, in this case a single piece of wicking material 75 that follows the corrugations of the heat exchanger and can be supported with structures similar to those in FIGS. 6–10. Another single piece wick 77 is shown on the under side of the heat exchanger and would serve to remove condensate, again assisted by gravity. Wick 75 supplies liquid to the evaporator side of the heat exchanger and would serve to remove condensate, again assisted by gravity. Wick 75 supplies liquid to the evaporator side of the heat exchanger and is shown with liquid container 79 that would contain liquid 81 to be picked up by the ends 83 of wick 75. Container 79 could also supply the wick 75 via small holes 85 and could be part of the wick support structure.

What is claimed is:

1. A distillation unit comprising:
   a first chamber;
   a second chamber;
   a dividing wall between said first and second chambers, wherein said dividing wall is configured to create a plurality of parallel face to face evaporable surfaces in said first chamber and a plurality of parallel face to face condensable surfaces in said second chamber;
   a distilland source contained within a lowermost portion of said first chamber;
   at least one capillary wiper partially immersed within said distilland source and further made to intimately contact at least some of said evaporative surfaces and to have a plurality of folds, said wiper configured to draw a portion of distilland from said distilland land source through capillary action;
   means for creating movement between said evaporative surface and said wiper, whereby said movement allows a thin film of distilland to be deposited upon said evaporative surface by said wiper;
   a passage between said first and second chambers positioned vertically higher than said distilland source surface level to enable vaporized distilland to migrate to said second chamber whereupon it is condensed;
   a plurality of wiper supports; and
   a holder upon which to secure said plurality of wiper supports in spaced relation, one of said wiper supports being located between each fold of said capillary wiper, wherein
   each of said folds in conjunction with said support is configured to fit within a space formed between parallel face to face surfaces, and said space formed between parallel face to face surfaces being between 0.2 and 0.02 inch.

2. A distillation unit comprising:
   a first chamber;
   a second chamber;
   a dividing wall between said first and second chambers, said dividing wall configured to create a plurality of parallel face to face evaporable surfaces in said first chamber and a plurality of parallel face to face condensable surfaces in said second chamber;
   a distilland source contained within a lowermost portion of said first chamber;
   at least one capillary wiper partially immersed within said distilland source and further made to intimately contact at least some of said evaporative surfaces and to have a plurality of folds, said wiper configured to draw a portion of distilland from said distilland source through capillary action;
   means for creating movement between said evaporative surface and said wiper, whereby said movement allows a thin film of distilland to be deposited upon said evaporative surface by said wiper;
   a passage between said first and second chambers positioned vertically higher than said distilland source surface level to enable vaporized distilland to migrate to said second chamber whereupon it is condensed;
   a plurality of wiper supports; and
   one or more holders upon which to secure said plurality of supports in spaced relation, wherein
   one of said supports is located between each fold of said capillary wiper, and
   each of said folds in conjunction with its support is configured to fit within the space formed between parallel face to face surfaces.

3. A distillation unit in accordance with claim 2 wherein the space formed between parallel face to face surfaces is between 0.2 and 0.0 inches.

4. A distillation unit in accordance with claim 2 wherein at least one of said folds in conjunction with its support is disposed within each of the spaces formed between said parallel face to face evaporable surfaces.

5. A distillation unit in accordance with claim 4 wherein said dividing wall is cylindrical and said plurality of parallel face to face evaporable surfaces and said plurality of parallel face to face condensable surfaces are circumferentially disposed around said cylindrically shaped dividing wall.

6. A distillation unit in accordance with claim 5 further comprising a rotatable assembly within which said holders are secured wherein said means for creating movement is accomplished by rotating said rotatable assembly about said cylindrically shaped dividing wall.

7. A distillation unit in accordance with claim 5 wherein at least one wiper is provided within said second chamber to remove condensed distillate vapor from said plurality of parallel face to face condensable surfaces.

8. An apparatus comprising:
   a source of liquid to be distilled;
   a heat exchanger surface having a surface area;
   a first liquid transport material having a first portion and a pad, the first portion immersed in the source of liquid to be distilled and the pad in physical contact with the heat exchanger surface;
   a second liquid transport material that is not immersed in the elevated source of liquid, the second liquid transport material having a pad in physical contact with the heat exchanger surface; and
   a motor coupled to at least one of the heat exchanger surface and the pads of the first and second liquid transport materials, the motor configured to impart a relative motion between the pads and the heat exchanger surface, wherein
   the first liquid transport material is configured and arranged so as to transport the liquid from the source to the pad through capillary action,
   the relative motion between the two pads and the heat exchanger surface causes the two pads to move across the heat exchanger surface area,
   the pad of the first liquid transport material is configured and arranged to deposit liquid onto the heat exchanger surface as the pad moves relative thereto, while the pad of the second liquid transport material is configured and arranged to remove a portion of the liquid deposited by the pad of the first liquid transport material, and
   the source of liquid to be distilled is elevated relative to the pad of the first liquid transport material, permitting gravity to assist in the transport of liquid from the source to the heat exchanger surface.

9. The apparatus of claim 8 wherein the second liquid transport material removes the liquid through capillary action, and the removal of the portion of the deposited liquid by the pad of the second liquid transport material leaves behind a thin film of liquid on the heat exchanger surface.

10. The apparatus of claim 8 wherein at least some of the liquid removed by the pad of the second liquid transport material is returned to the liquid source.

11. The apparatus of claim 8 further comprising:

a first chamber having a lower portion configured to contain the source of liquid;

a second chamber; and a compressor coupled to the first and second chambers, wherein the heat exchanger surface is configured and arranged as a dividing wall separating the first and second chambers, liquid deposited onto the heat exchanger surface in the first chamber evaporates into a vapor, vapor from the first chamber is received by the compressor, compressed and delivered to the second chamber, and compressed vapor from the compressor condenses in the second chamber.

12. The apparatus of claim 11 wherein the heat exchanger surface has a plurality of back-and-forth folds so as to define a plurality of surface elements, and the first and second liquid transport materials each have a plurality of respective back-and-forth folds such that the first and second folded liquid transport materials interfit within the folded heat exchanger surface.

13. The apparatus of claim 12 wherein the first liquid transport material extends contiguously between the elevated source and the heat exchanger surface.

14. The apparatus of claim 8 wherein the pad of the first liquid transport material moves ahead of the pad of the second liquid transport material relative to the heat exchanger surface.

\* \* \* \* \*